(12) United States Patent
Kawakami et al.

(10) Patent No.: US 6,303,235 B1
(45) Date of Patent: Oct. 16, 2001

(54) COPPER-BASED SLIDING ALLOY

(75) Inventors: Naohisa Kawakami; Tsukimitsu Higuchi; Yoshiaki Sato; Takayuki Shibayama, all of Nagoya; Keizo Mizuno; Kenji Yamanouchi, both of Tokyo, all of (JP)

(73) Assignees: Daido Metal Company Ltd., Nagoya; Kayaba Kogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/283,182

(22) Filed: Apr. 1, 1999

(30) Foreign Application Priority Data

Apr. 7, 1998 (JP) .................................................. 10-112799

(51) Int. Cl.⁷ ............................. B32B 15/20; B22F 1/00; C22C 9/08; F16C 33/12
(52) U.S. Cl. ......................... 428/553; 428/564; 428/677; 419/11; 419/13; 419/14; 419/19; 75/231; 75/232; 75/236; 75/243; 75/246; 420/474; 420/475; 420/491; 384/940; 384/912; 384/913
(58) Field of Search ..................................... 428/553, 564, 428/677; 75/246, 231, 232, 236, 243; 419/8, 9, 11, 13, 14, 17, 19, 23, 32; 384/910, 912, 913; 420/474, 475, 491

(56) References Cited

U.S. PATENT DOCUMENTS

| 5,004,581 | * | 4/1991 | Takagai et al. | 420/487 |
| 5,256,494 | * | 10/1993 | Tanaka et al. | 428/552 |
| 5,279,638 | * | 1/1994 | Asada et al. | 75/235 |
| 5,326,384 | * | 7/1994 | Asada et al. | 75/231 |
| 5,938,864 | * | 8/1999 | Tomikawa et al. | 148/235 |

FOREIGN PATENT DOCUMENTS

| 2045806 | * | 11/1980 | (GB) . |
| 04-088137 | | 3/1992 | (JP) . |
| 10-46271 | * | 2/1998 | (JP) . |
| 10-46272 | * | 2/1998 | (JP) . |

* cited by examiner

Primary Examiner—John J. Zimmerman
(74) Attorney, Agent, or Firm—Browdy and Neimark

(57) ABSTRACT

There is provided a copper-based sliding alloy excellent in wear resistance and anti-seizure property. A phase of 2 to 30 wt. % lead is dispersed in the copper alloy. This lead phase contains 0.1 to 6 vol. % hard particles such as SiC, $SiO_2$, $Si_3N_4$, $Al_2O_3$, TiC, WC and TiN having an average particle size of 5 to 25 μm. Because hard particles are included in the lead phase, wear resistance is excellent and anti-seizure property is improved. The lead phase, which is soft, serves as a cushion and the attack on a mating member by hard particles is reduced. Further, the falling-off of lead is minimized because the lead phase also includes the hard particles.

16 Claims, 2 Drawing Sheets

- MATRIX
- Pb PHASE
- HARD PARTICLES x 500

10μm

- MATRIX
- Pb PHASE
- HARD PARTICLES x 450

10μm x 450  10μm

COPPER-BASED SLIDING ALLOY

BACKGROUND OF THE INVENTION

The present invention relates to a copper-based sliding alloy excellent in wear resistance and, more particularly, to a copper-based sliding alloy applied to sliding bearings, valve plates and the like.

A technique related to copper-based sliding alloys with increased wear resistance is disclosed in JP-A-4-88137.

In this conventional technique, a sliding alloy is obtained by mixing solid lubricants, such as graphite, molybdenum disulfide and lead, and hard particles of SiC, $SiO_2$, $Si_3N_4$, $Al_2O_3$, TiC, WC, TiN, etc. with copper alloy powder and by hot extruding the mixture. It is disclosed that a sliding alloy excellent in wear resistance and anti-seizure property is obtained by blending appropriate amounts of these lubricants and hard particles in a well-balanced manner.

However, higher performance such as sliding property has been required in recent sliding materials. In the above conventional technique which involves dispersing lubricants and hard particles in a matrix of copper, anti-seizure property is obtained from solid lubricants and wear resistance is obtained from hard particles. Wear resistance and anti-seizure property are improved by the contents of solid lubricants and hard particles. For this reason, anti-seizure property deteriorates when the content of hard particles is raised to increase wear resistance, whereas wear resistance deteriorates when the content of solid lubricants is raised to improve anti-seizure property. Therefore, there have existed limitations to the improvement of these properties.

SUMMARY OF THE INVENTION

An object of the present invention is to provide a copper-based sliding alloy excellent in wear resistance and anti-seizure property, which is obtained by dispersing a phase of lead in a matrix of copper and locating hard particles in the dispersed lead phase.

According to one aspect of the present invention, there is provided a copper-based alloy which comprises a phase of 2 to 30 wt. % lead, 0.1 to 6 vol. % hard particles having an average particle size of 5 to 25 $\mu$m, and a matrix selected from the group consisting of copper and copper alloy. The above hard particles are included in the lead phase, which is dispersed in the matrix.

The copper alloy preferably contains 0.5 to 15 wt. % tin. The effect of tin on an increase in alloy strength cannot be obtained when the tin content is less than 0.5 wt. %. Furthermore, when the tin content exceeds 15 wt. %, many Cu—Sn compounds are formed, making the copper alloy brittle. Further, in this case thermal conductivity also decreases, resulting in a decrease in anti-seizure property.

The matrix may be strengthened by adding at least one kind selected from the group consisting of nickel, iron, aluminum, zinc and manganese in amounts of up to 40 wt. % in total to the copper alloy. Furthermore, wear resistance may be increased by adding the solid lubricants of $MOS_2$, $WS_2$, BN and graphite that have self-lubricity.

Lead forms a lead phase dispersed in the matrix of the copper alloy, which lead phase brings about wear resistance and anti-seizure property. The improvement in anti-seizure property cannot be expected when the lead content is less than 2 wt. % because it becomes impossible for such Pb phase to contain hard particles therein. Furthermore, strength decreases when the lead content exceeds 30 wt. %. Therefore, the lead content should be 2 to 30 wt. % and, preferably 5 to 25 wt. %.

It is desirable that the lead phase be uniformly dispersed. Lead is present in discontinuous granular form when its content is low, whereas it is present in continuous network form when its content is high. However, either of the two forms is good.

Oxides, nitrides, carbides, etc. of such metals as SiC, $SiO_2$, $Si_3N_4$, $Al_2O_3$, TiC, WC and TiN may be used as hard particles and the average particle size may be 5 to 25 $\mu$m. When the average particle size exceeds 25 $\mu$m, it is difficult to make hard particles included in the lead phase especially with low lead contents and hard particles have a strong tendency to attack a mating member with which the copper-based alloy mates. When the average particle size is less than 5 $\mu$m, it is difficult to disperse hard particles. For these reasons, the average particle size of hard particles may be 5 to 25 $\mu$m and preferably 8 to 20 $\mu$m. Especially when the average particle size is in the range of 10 to 18 $\mu$m, it is easy to make hard particles included into the lead phase and, at the same time, hard particles exhibit such an action as to make the sliding surface of the mating member smooth by leveling its roughness.

Hard particles are present in such a manner that they are embraced in the lead phase dispersed in the matrix of the copper alloy. Therefore, as shown in FIG. 4, a soft lead phase 3 serves as a cushion on the sliding surface, and the attack on the mating member by a hard particle 2 exposed on the surface of a matrix 1 is reduced.

When there is no hard particle 2 in the lead phase 3, lead is apt to be carried away onto the sliding surface during sliding as shown in FIG. 5. In the present invention, however, the carrying-away of lead is prevented by the presence of the hard particle 2. Even when the hard particle is carried away, another hard particle is again captured by the lead phase because of its embeddability and, therefore, abrasive wear is reduced.

Because hard particles are incorporated into the lead phase, wear resistance is excellent and anti-seizure property is improved. For this reason, the quantity of hard particles, which depends on the lead content, is preferably 0.1 to 6 vol. %. When the quantity of hard particles is less than 0.1 vol. %, the presence of hard particles is not effective in improving wear resistance. When the quantity of hard particles exceeds 6 vol. %, hard particles that are not embraced by the lead phase increase and their attack on the mating member increases. The quantity of hard particles, i.e., 0.1 to 6 vol. %, which varies depending on the composition and lead content of the copper alloy, corresponds to about 0.03 to 2.2 wt. % when it is converted to weight % in the case of SiC, for example.

The powder sintering method is desirable as a method for producing the alloy of the present invention. In a case of a hot extrusion method, the lead phase is elongated in the extrusion direction, with the result that an orientation is generated and, at the same time, it occurs such an undesirable state as hard particles are less apt to be embraced by the lead phase.

In addition to alloy powder, mixed powder may be used as copper-based powder. A green compact-sintering method is preferable for sliding materials composed of a copper-based sliding alloy alone, which sliding materials are used for valve plates and shoes of hydraulic pump and motor, for example. In a sliding material formed by bonding a copper-based sliding alloy to a back metal, such as a sliding bearing, a sintering method is preferable in which sintering is performed after disposing a raw material powder onto the back metal. A sliding material with increased strength can be obtained when the density thereof is increased by performing rolling before and/or after the sintering thereof.

In the present invention, a copper-based sliding alloy having superior wear resistance can be obtained because the copper-based alloy consists of a phase of 2 to 30 wt. % lead, 0.1 to 6 vol. % hard particles having an average particle size of 5 to 25 μm, and a matrix selected from the group consisting of copper and copper alloy. The above hard particles are included in the lead phase, which is dispersed in the matrix.

DETAILED DESCRIPTION OF THE PREFERRED EMBODIMENTS

Figure 1:
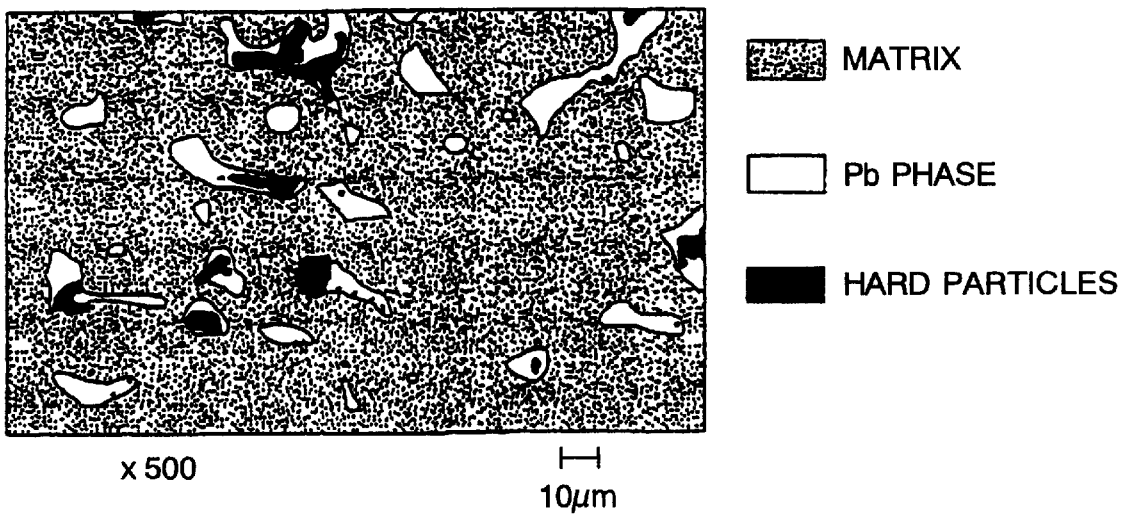
FIG. 1 is a schematic view depicted from an electron microscope photograph of the structure of the example of embodiment 2.

Embodiments of the present invention, along with comparative examples, will be described in detail below.

$Al_2O_3$ powder having an average particle size of 8 μm or SiC powder of 15 μm was mixed with alloy powder having a particle size of not more than 250 μm for one hour by means of a mixer so that each composition of the present embodiments (embodiment 1 to embodiment 10) and comparative examples 1 to 4 shown in Table 1 was obtained. The mixed powder thus obtained was disposed on a copper-plated steel sheet 1.2 mm in thickness, the first sintering was performed for 20 minutes by heating to 700 to 900° C. in a reducing atmosphere, and rolling by rolls was performed after that. Sintering and rolling by rolls were then performed under the same conditions as in the first sintering and a sliding material in which a copper-based sliding alloy was bonded to a back metal was obtained. The thickness of the sliding alloy thus obtained was 0.6 mm.

In examples of embodiment 3, 4, etc. and comparative example 4 in which graphite was added as a solid lubricant, the graphite was mixed by being charged into the mixer along with the alloy powder, etc.

FIG. 1 is a schematic view showing an electron microscope photograph of the structure of an example of embodiment 2 produced in this manner. The lead phase is present in discontinuous granular form in the matrix of copper alloy and hard particles are included in this lead phase.

Figure 2:
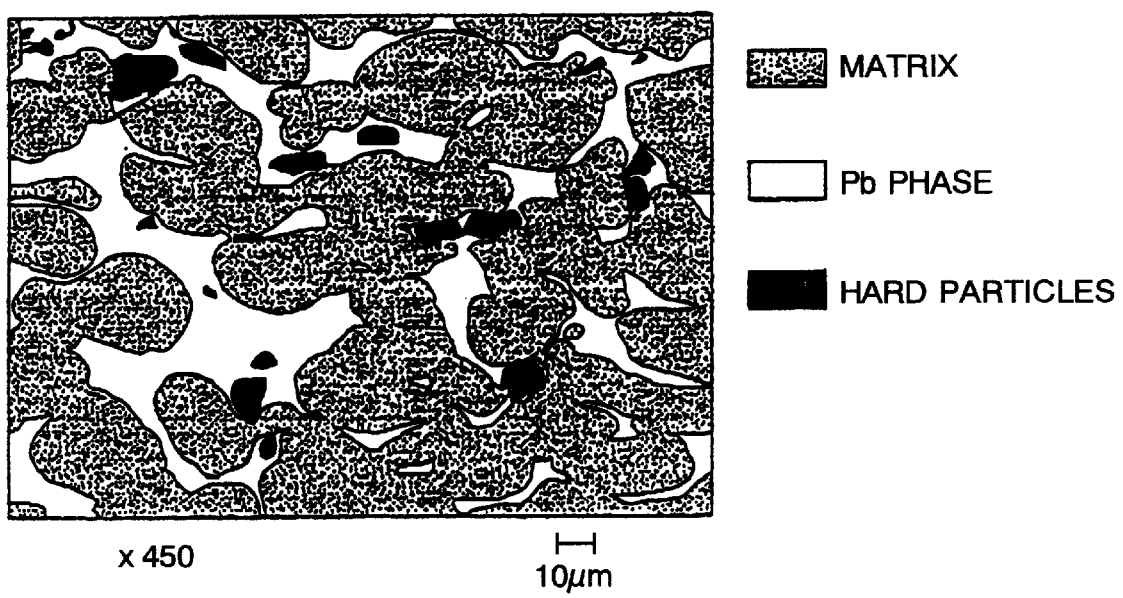
FIG. 2 is a schematic view depicted from an electron microscope photograph of the structure of the example of embodiment 5.

FIG. 2 is a schematic view showing an electron microscope photograph of the structure of an example of embodiment 5 which contains 23 wt. % lead. The lead phase is dispersed in continuous network form in the matrix of copper alloy and hard particles are included in this lead phase.

Figure 3:
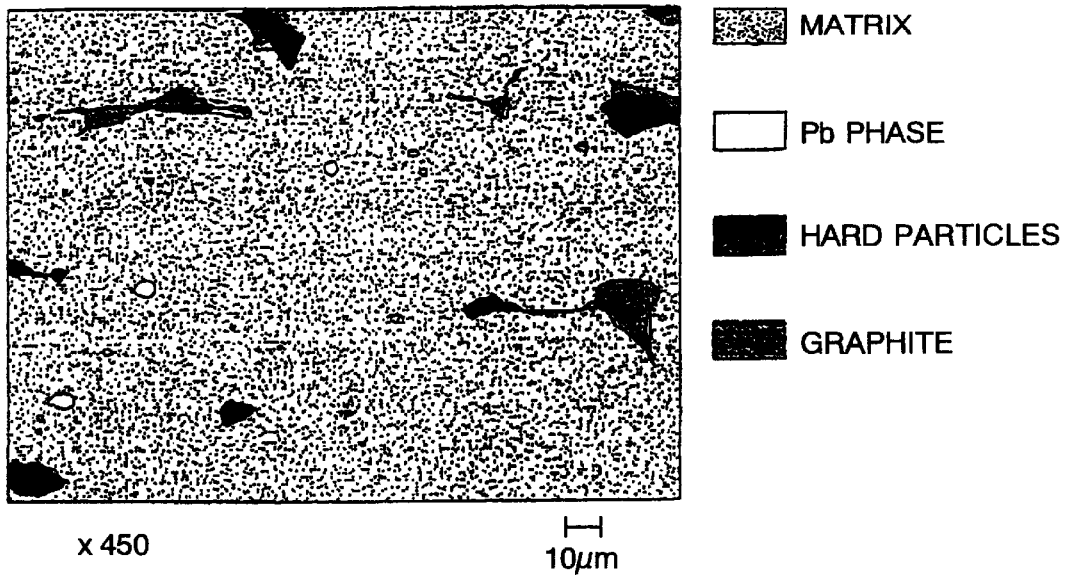
FIG. 3 is a schematic view depicted from an electron microscope photograph of the structure of comparative example 4.
Figure 4:
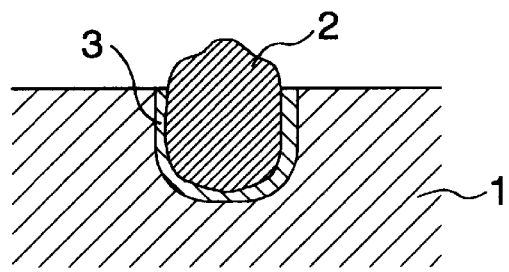
FIG. 4 is a sectional view showing a state of hard particles on the sliding surface.
Figure 5:
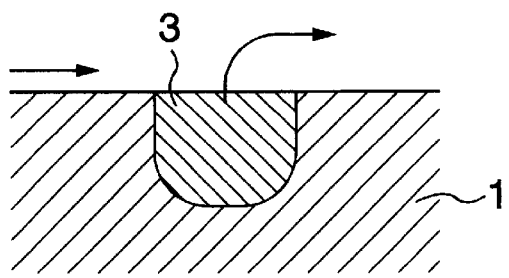
FIG. 5 is a sectional view showing a state of lead on the sliding surface.

FIG. 3 is a schematic view showing an electron microscope photograph of the structure of comparative example 4. A lead phase of about 5μm is dispersed in the matrix of copper alloy. Because the lead content is as low as 1 wt. %, hard particles are present at the boundaries defined between the matrix and the lead phase.

Next, the above sintered bimetal was cut to in the shape of a washer 27.2 mm in outside diameter and 22 mm in inside diameter as a sheet specimen. The alloy surface of the specimen was finished smooth and a wear test and an anti-seizure test were conducted.

TABLE 1

| | | Composition (wt. %) | | | | Composition (vol. %) | | |
| | | Cu alloy | | | | Solid lubricant | Hard particles | |
| Kind | No. | Cu | Sn | Pb | Ni | Gr* | $Al_2O_3$ (8 μm) | SiC (15 μm) |
|---|---|---|---|---|---|---|---|---|
| Embodiments of the invention | 1 | Rem | — | 25 | — | — | — | 2 |
| | 2 | Rem | 10 | 10 | — | — | — | 1.5 |
| | 3 | Rem | 1.5 | 30 | — | 1.5 | 4 | — |
| | 4 | Rem | 6 | 2 | — | 3.5 | 1 | — |
| | 5 | Rem | 1.5 | 23 | 15 | — | — | 3 |
| | 6 | Rem | 10 | 10 | — | 2 | 2.5 | — |
| | 7 | Rem | 11 | 5 | — | 8 | 0.3 | — |
| | 8 | Rem | 3.5 | 23 | 3 | 4 | — | 5.5 |
| | 9 | Rem | 1.5 | 23 | — | — | — | 0.3 |
| | 10 | Rem | 3.5 | 23 | — | — | 3 | — |
| Comparative examples | 1 | Rem | — | 25 | — | — | — | — |
| | 2 | Rem | 10 | 10 | — | — | — | — |
| | 3 | Rem | 1.5 | 35 | — | — | 2.5 | — |
| | 4 | Rem | 11 | 1 | — | 4 | — | 1.5 |

*Gr means graphite.

The wear test was conducted under the conditions shown in Table 2 by means of the Suzuki testing machine.

TABLE 2

| item | conditions |
|---|---|
| bearing size (thrust washer) | 27.2 × 22 (mm) (outer dia. × inner dia.) |
| test load | 7.5 MPa |
| time of test | 4 hours |
| pheripheral speed | 0.01 m/s |
| lubricant oil | SAE30 |
| lubricant oil temperature | room temperature |
| method of lubrication | oil bath |
| shaft material | JIS S55C |
| roughness of bearing surface (Rmax) | 1 μm |
| shaft hardness (Hv. 10) | 500~600 |

The results shown in Table 3 were obtained in this wear test.

TABLE 3

| Kind | No. | amount of wear (μm) |
|---|---|---|
| embodiments of the invention | 1 | 4 |
| | 2 | 2 |
| | 3 | 5 |
| | 4 | 3 |
| | 5 | 3 |
| | 6 | 1 |
| | 7 | 7 |
| | 8 | 2 |
| | 9 | 6 |
| | 10 | 2 |
| comparative examples | 1 | 25 |
| | 2 | 16 |
| | 3 | 22 |

TABLE 3-continued

| Kind | No. | amount of wear (μm) |
|---|---|---|
|  | 4 | 25 |

It became apparent from the results that the amount of wear was as large as 16 μm in comparative example 2 in which hard particles are not contained, whereas in example of embodiment 2 in which 1.5 vol. % SiC is added, the amount of wear was 2 μm. This shows that wear resistance was remarkably improved.

In comparative example 4 with a lead content of 1 wt. %, the amount of wear was as large as 25 μm. Also, in comparative example 3 with a lead content of 35 wt. %, the amount of wear was as large as 22 μm.

Next, the seizure test was conducted under the conditions shown in Table 4 by means of the Suzuki testing machine.

TABLE 4

| item | conditions |
|---|---|
| bearing size (thrust washer) | 27.2 × 22 (mm) (outer dia. × inner dia.) |
| test load | accumulation of 5 MPa |
| time of test | accumulation per every 30 min. |
| pheripheral speed | 2 m/s |
| lubricant oil | SAE30 |
| lubricant oil temperature | room temperature |
| method of lubrication | oil bath |
| shaft material | JIS S55C |
| roughness of bearing surface (Rmax) | 1 μm |
| shaft hardness (Hv. 10) | 500~600 |

The results shown in Table 5 were obtained in the seizure test.

TABLE 5

| Kind | No. | maximum load at which no seizure occurs (MPa) |
|---|---|---|
| embodiments of the invention | 1 | 25 |
|  | 2 | 25 |
|  | 3 | 25 |
|  | 4 | 20 |
|  | 5 | 20 |
|  | 6 | 20 |
|  | 7 | 20 |
|  | 8 | 25 |
|  | 9 | 25 |
|  | 10 | 25 |
| comparative examples | 1 | 15 |
|  | 2 | 15 |
|  | 3 | 20 |
|  | 4 | 10 |

In comparative examples 1 and 2 in which hard particles are not contained, the maximum load when no seizure occurred was 15 MPa and somewhat low. In comparative examples 4 in which lead is contained only in an amount of 1 wt. %, this value was as low as 10 MPa. On the other hand, in examples of embodiment 1 to 10, the maximum load when no seizure occurred was not less than 20 MPa in all samples.

What is claimed is:

1. A copper-based sliding alloy comprising a phase of 2 to 30 wt % lead based on the total alloy, 0.1 to 6 vol. % hard particles based on the total alloy, said hard particles having an average particle size of 5 to 25 μm and mostly being included in the lead phase, and a matrix selected from the group consisting of copper and copper alloy, said lead phase being dispersed in said matrix, and wherein said hard particles are selected from the group consisting of metal oxides, metal nitrides, metal carbides and mixtures thereof.

2. A copper-based sliding alloy according to claim 1, said copper alloy containing 0.5 to 15 wt. % tin.

3. A copper-based sliding alloy according to claim 2, said copper alloy containing at least one kind up to 40 wt. % in total selected from the group consisting of nickel, iron, aluminum, zinc and manganese.

4. A copper-based sliding alloy according to claim 2, said sliding alloy further containing at least one kind of 1 to 20 vol. % in total selected from the group consisting of $MoS_2$, $WS_2$, BN and graphite.

5. A copper-based sliding alloy according to claim 2, said copper alloy containing at least one kind up to 40 wt. % in total selected from the group consisting of nickel, iron, aluminum, zinc and manganese.

6. A copper-based sliding alloy according to claim 5, said sliding alloy further comprising at least one kind of 1 to 20 vol. % in total selected from the group consisting of $MoS_2$, $WS_2$, BN and graphite.

7. A copper-based sliding alloy according to claim 2, said sliding alloy further containing at least one kind of 1to 20 vol. % in total selected from the group consisting of $MoS_2$, $WS_2$, BN and graphite.

8. A copper-based sliding alloy according to claim 1, said copper alloy containing at least one kind up to 40 wt. % in total selected from the group consisting of nickel, iron, aluminum, zinc and manganese.

9. A copper-based sliding alloy according to claim 8, said sliding alloy further containing at least one kind of 1 to 20 vol. % in total selected from the group consisting of $MoS_2$, $WS_2$, BN and graphite.

10. A copper-based sliding alloy according to claim 1 said sliding alloy further containing at least one kind of 1 to 20 vol. % in total selected from the group consisting of $MoS_2$, $WS_2$, BN and graphite.

11. A method of producing a copper-based sliding alloy according claim 1, comprising the steps of mixing powder raw materials, and sintering the mixed powder raw materials.

12. A sliding material formed of the copper-based sliding alloy of claim 1.

13. A sliding material comprising a layer of the copper-based sliding alloy of claim 1, and a back metal bonded to said layer of the copper-based sliding alloy.

14. The sliding material of claim 13 wherein the average particle size of said hard particles is 10–18 μm.

15. The copper-based sliding alloy of claim 1 wherein said lead content is 5–25 wt %.

16. The copper-based sliding alloy of claim 15 wherein the average particle size of said hard particles is 8–20 μm.

* * * * *